Sept. 1, 1925.　　　　　　　　　　　　　　　　1,551,740
L. R. HEBERT ET AL
AUTOMATIC BRAKE ACTUATOR FOR MOTOR VEHICLES
Filed March 3, 1923
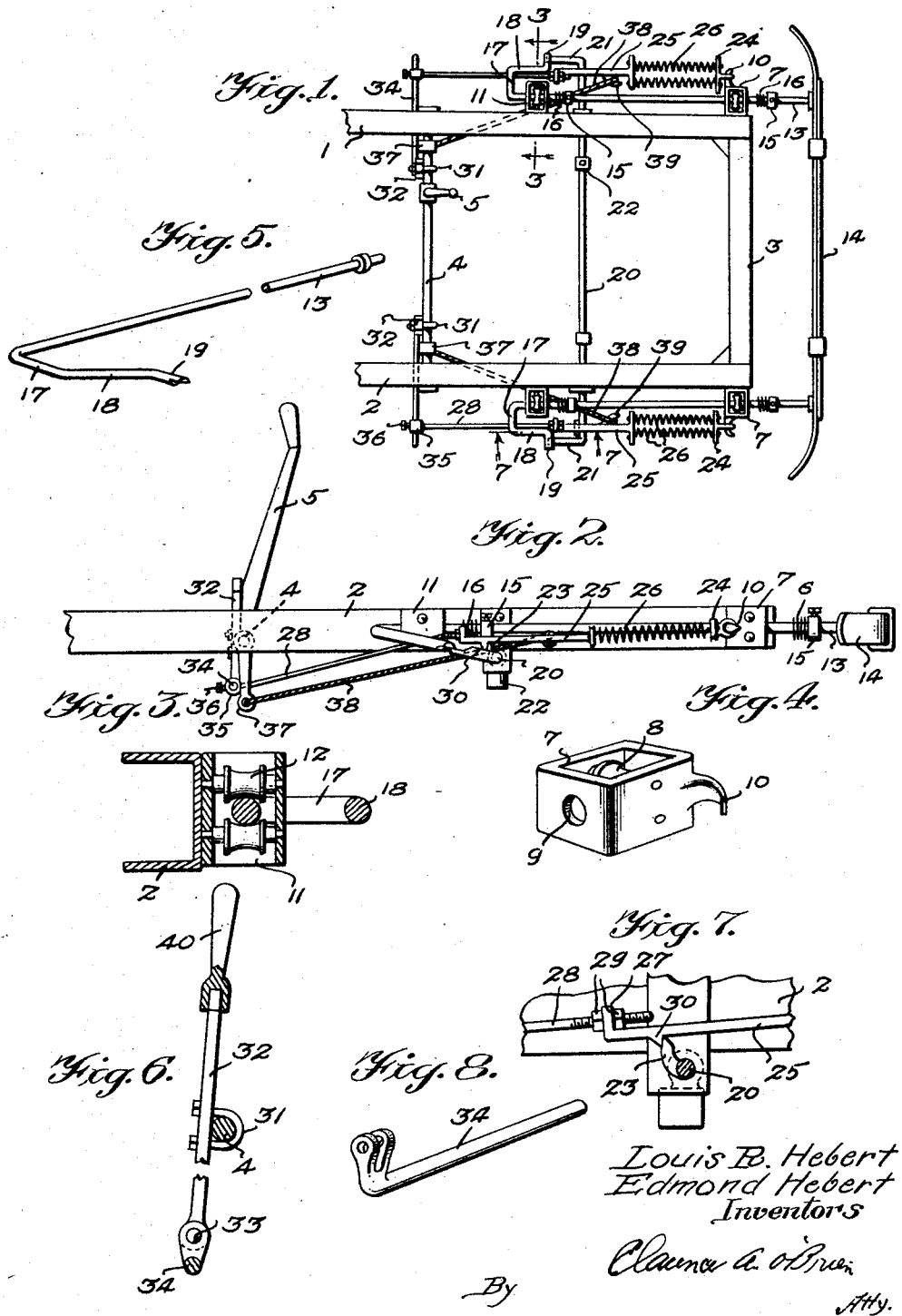

Patented Sept. 1, 1925.

1,551,740

UNITED STATES PATENT OFFICE.

LOUIS R. HEBERT AND EDMOND HEBERT, OF FALL RIVER, MASSACHUSETTS.

AUTOMATIC BRAKE ACTUATOR FOR MOTOR VEHICLES.

Application filed March 3, 1923. Serial No. 622,501.

*To all whom it may concern:*

Be it known that we, LOUIS R. HEBERT and EDMOND HEBERT, citizens of the United States, residing at Fall River, in the county of Bristol and State of Massachusetts, have invented certain new and useful Improvements in Automatic Brake Actuators for Motor Vehicles, of which the following is a specification.

The primary object of our invention is to substantially improve upon the automatic brake actuator for motor vehicles, and particularly the resetting mechanism therefor, shown and described in our co-pending application, Serial #607,571, filed December 18th, 1922.

In this co-pending application, it is necessary that the actuating mechanism for the brakes be set at a point remote from the seat of the vehicle operator, this, obviously, being a great disadvantage. In the present application, the brake actuating mechanism may be easily and expeditiously reset by the driver of the vehicle, without the necessity of him leaving his seat.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein :—

Figure 1 is a top plan view of the front end of a motor vehicle frame, disclosing our improved brake actuating mechanism associated therewith.

Figure 2 is an elevational view of one side thereof.

Figure 3 is a transverse cross sectional view upon the line 3—3 of Figure 1, and looking rearwardly in the direction of the arrows.

Figure 4 is a perspective view of one of the front roller carrying brackets which forms a component part of the present invention.

Figure 5 is a perspective view of one of the trip arms or rods constituting a part of our automatic brake actuating mechanism.

Figure 6 is a sectional view through the usual brake actuating shaft of the motor vehicle, disclosing in conjunction therewith, a handle lever for the purpose of resetting our device.

Figure 7 is an enlarged detail cross section upon the line 7—7 of Figure 1, and

Figure 8 is a perspective of one of the connecting arms, employed in conjunction with our invention.

Referring to the drawings in detail, we have shown our device as associated with a motor vehicle, constituting the usual chassis frame including side bars 1 and 2, and a front connecting bar 3. The rear ends of these bars 1 and 2 are connected by another bar similar to the front member 3, as is readily apparent. Between the side frame bars 1 and 2, and spaced from the front ends thereof is the usual transverse brake shaft 4 of the vehicle. This shaft 4 is journaled between the said bars 1 and 2, and carries the usual operating handle 5. Upon the outer sides of each of the frame bars 1 and 2, and at the forward end thereof are rectangular shaped roller carrying bracket members 7. These brackets are more clearly shown in Figure 4, it being understood that each of the same carries a pair of rollers 8 journaled within the brackets, the front and rear walls of each of the said bracket members being formed with alined openings 9, whilst the walls of the same remote from the chassis bars 1 and 2, are formed with laterally extending, forwardly curved lugs or ears 10.

Rearwardly of the front brackets 7 are other roller carrying brackets 11, Figure 3, the same being also secured to the outer sides of the frame bars 1 and 2. These brackets 11 are substantially the same as the brackets 7, each being provided with the pairs of spaced rollers 12, and formed on their end walls with aligned openings.

Slidably disposed within the said openings between the rollers of the brackets 7 and 11 upon the respective chassis bars 1 and 2, is a bar or rod 13, the rods upon opposite sides of the machine frame adapted for free rectilinear movement within the said brackets 7 and 11. The front ends of these rods 13 are connected in any manner desirable to a suitable form of spring bumper 14, and formed or secured in any manner desirable upon each of the rods 13 and forwardly of each of the roller brackets are collars 15. Encircling these rods between each collar and adjacent roller bracket are coiled springs 16, functioning as a cushioning means for the rods 13 when the same are slid rearwardly.

As shown more clearly in Figure 5, the free end of each rod 13 is right angularly bent as at 17, and formed upon the ends of these right angular portions are forwardly extending and downwardly bent arms 18, each of which carries a laterally extending right angular lug or finger 19.

Slightly forwardly of the rear roller carrying brackets 11, and journaled between the frame bars 1 and 2, is a rock shaft 20, the ends thereof being rearwardly bent as at 21. As a means for normally maintaining the rock shaft 20 in the position shown in Figures 1 and 2, we have provided adjustable weights 22, secured at desirable points thereon. The said rock shaft 20 is further formed adjacent each of its bent ends 21 with normally vertically disposed dogs 23, more clearly shown in the detail view, Figure 7.

Detachably arranged upon the said laterally extending lugs or fingers 10 of the front roller carrying brackets 7 are T plates 24, these plates being connected to relatively longer T plates 25, through the instrumentality of pairs of relatively strong coiled springs 26. Again referring to Figure 7, the said last mentioned T plates 25 are formed with their ends remote from said springs 26 with vertical extensions 27, the same being formed with openings and adapted for the reception of the screw threaded ends of rearwardly extending rods 28, it being noted that these rods are adjustably connected to the said T members 25, through the nut fasteners 29. The T members are further formed with pendent shoulders 30, adapted for bringing up against the said dogs 23 of the rock shaft 20, when the plates 24 and 25 have been separated for maintaining the springs 26 in their extended position as shown in the views, for a purpose hereinafter described.

Pivotally connected adjacent the opposite ends of the said brake actuating shaft 4 of the motor vehicle, through the instrumentality of strap connections 31 are levers 32, the same extending upwardly and passing through slots in the floor board of the motor vehicle. Pivotally connected as at 33 to the lower ends of these levers 32 are connecting rods 34, these rods for the respective levers 32 extending laterally in opposite directions as shown in Figure 4. The free ends of the said rods 28 that are connected to the T members 25 are formed with collars 35, the same receiving the ends of the said rods 34, these rods being maintained within the collars through the instrumentality of set screws 36.

The said brake shaft 4 of the vehicle is further formed adjacent its ends with pendent arms 37, the lower ends of which are formed with openings for receiving one end of cables 38, these cables 38 extending forwardly and outwardly, and being in turn connected at their opposite ends to ears 39 formed upon the inner sides of the said T members 25 in the several views, our automatic brake actuator is being shown as being set and should the bumper 14 at any time strike an obstacle, the rods 13 will obviously be moved forwardly for consequently releasing the rearwardly bent ends 21 of the rock shaft 20 from the said laterally extending lugs or fingers 19 of these rods. As soon as the rock shaft 20 is released, the coiled springs 26 will naturally pull upon the T plates 25, the said rock shaft being released permitting the abutments 30 and the plates 25 to override the dogs 23. Through the contraction of the springs 26, the cables 38 will be consequently drawn forwardly for naturally rocking the said shaft 4 in the direction in which it would ordinarily be rocked through the rearward movement of the brake lever 5 for consequently applying the machine brakes for bringing the same to a stop.

In the resetting of our brake actuating mechanism, handles 40, Figure 6, may be positioned upon the upper end of the said levers 32. Pushing forwardly upon these handles, the same will be rocked upon the brake shaft 4, for consequently retracting the T plates 25 in view of their connection to the lower ends of these levers 32, this rearward movement of the T plates 24 causing the abutments 30 thereof to override the dogs 23 in view of the rocking nature of the shaft 20 upon which they are formed, and by forcing the ears or lugs 19 of the said rods 13 over the rearwardly bent ends 21 of the rock shaft 20, the parts will be held in this position until the bumper 14 again strikes an obstacle.

Having thus described our invention, what we claim as new, and desire to secure by Letters-Patent is:—

A combined motor vehicle guard and controller including a bumper supported in advance of the frame of the vehicle and provided with longitudinally movable supporting rods, a brake shaft pivoted upon the frame of the vehicle, spring means connected with the frame and the brake shaft and normally holding the shaft in a position to apply the brake, a rock shaft journaled upon the frame and carrying a latch member which is engageable with the spring means, said longitudinally movable supporting rod having offset ends and the rock shaft having angularly disposed end portions engaged under the offset end portions of the longitudinally movable supporting rods when said supporting rods are in their normal position, and said latch member adapted to retain said spring means in a position whereby the brake shaft is held released.

In testimony whereof we affix our signatures.

LOUIS R. HEBERT.
EDMOND HEBERT.